United States Patent
Danz et al.

(10) Patent No.: US 7,139,618 B2
(45) Date of Patent: Nov. 21, 2006

(54) METHOD OF OPERATION AND A CONTROL PROGRAM FOR A CENTRAL UNIT IN AN AUTOMATION SYSTEM

(75) Inventors: Mirko Danz, Feucht (DE); Johannes Extra, Erlangen (DE); Michael Franke, Erlangen-Dechsendorf (DE); Hermann Jartyn, Igensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 106 days.

(21) Appl. No.: 10/865,946

(22) Filed: Jun. 10, 2004

(65) Prior Publication Data
US 2005/0166203 A1    Jul. 28, 2005

(30) Foreign Application Priority Data
Jun. 12, 2003   (DE)  ................. 103 26 542

(51) Int. Cl.
G05B 11/01 (2006.01)
(52) U.S. Cl. .................. 700/23; 700/2; 700/3; 700/9; 700/11; 718/100; 718/108; 719/331; 719/332; 719/318; 717/127; 717/131; 717/154; 710/260; 710/266
(58) Field of Classification Search .............. 700/2, 700/3, 9–11, 23; 718/100, 106; 719/331, 719/332, 318; 717/127, 131, 154; 710/260, 710/266
See application file for complete search history.

(56) References Cited

U.S. PATENT DOCUMENTS

| | | | | |
|---|---|---|---|---|
| 4,907,190 A | * | 3/1990 | Sasaki et al. | 710/5 |
| 5,293,024 A | * | 3/1994 | Sugahara et al. | 219/121.67 |
| 6,629,173 B1 | * | 9/2003 | Iijima | 710/107 |
| 6,922,611 B1 | * | 7/2005 | Lapham | 700/245 |

FOREIGN PATENT DOCUMENTS

| | | |
|---|---|---|
| DE | 199 06 695 A1 | 8/2000 |
| WO | WO-97/11415 A1 | 3/1997 |

OTHER PUBLICATIONS

German Examination Report, dated May 17, 2004, and its Certified English language translation.
Wraitil, P. "Sicherheits-Dongle-Sicheheitssystem fur den Maschinen- un Aniagenbau" [Security dongle—security system for mechanical engineering and plant construction], and its Certified English language translation, in: IEE, 44th year, 1999, No. 11.
English language Abstract for DE 199 06 695 A1.

* cited by examiner

*Primary Examiner*—Ramesh Patel
(74) *Attorney, Agent, or Firm*—White & Case LLP

(57) ABSTRACT

The present invention is directed to a method of operation and a control program for a central unit (e.g., CPU) in an automation system repeatedly executing a control program that is stored in the central unit and comprises at least two subprograms. A single instance of execution occurs within a cycle time which is stipulated by the control program. The central unit executes only one of the subprograms—the activated subprogram—at a time. The cycle time is independent of the activated subprogram, is shorter than the time required in order to execute all of the subprograms, and is at least as long as the longest time period required in order to execute one of the subprograms once.

26 Claims, 3 Drawing Sheets

|  |  | TP1 | TP2 | TP3 |
|---|---|---|---|---|
| SM1 | t1 | X |  |  |
| SM2 | t2 | X | X | X |
| SM3 | t3 |  | X | X |
| SM4 | t4 |  |  | X |
| KM1 | t5 | X |  | X |
| KM2 | t6 | X |  |  |
| KM3 | t7 | X | X | X |
| KM4 | t8 |  | X | X |

METHOD OF OPERATION AND A CONTROL PROGRAM FOR A CENTRAL UNIT IN AN AUTOMATION SYSTEM

FIELD OF THE INVENTION

The present invention relates to a method of operation for a central unit (e.g., central processing unit or CPU) in an automation system, where the central unit repeatedly executes a control program which is stored in the central unit. A single instance of execution of the control program occurs within a cycle time which is stipulated by the control program.

BACKGROUND OF THE INVENTION

The present invention also relates to a control program for carrying out such a method of operation, in a central unit of an automation system and in an automation system itself.

Automation systems, their central units, and also methods of operation and control programs for central units are general knowledge.

In the prior art, it may be that the control program comprises at least two subprograms, with only one of the subprograms being activated at a time and the central unit executing only the activated subprogram. One example of such a situation involves, by way of example, an automation system controlling an industrial technical process which can be divided into consecutively executable sub-processes.

In the prior art, the following procedures are known for controlling such an industrial technical process. The control program stored in the central unit comprises at least two subprograms. All of the subprograms are equivalent from the point of view of the central unit. In particular, the control program does not provide the central unit with prior knowledge of how many and what subprograms are active at what time.

In this case, the cycle time stipulated by the control program needs to have been determined to be of a length such that it is at least as long as the time which is required in order to execute all of the subprograms.

In this case, it is admittedly possible to change the subprograms dynamically. Since the dynamics of the control program are determined essentially by the cycle time, however, only relatively low dynamics can be provided.

Alternatively, it is known practice to create a separate control program for each subprogram. In this case, the cycle time for each subprogram may be individually chosen to be short enough for it to suffice just for executing the respective subprogram. However, changing from one subprogram to another subprogram requires that the execution of the subprogram currently being executed be interrupted, that the new subprogram to be executed be subsequently loaded into the central unit, and that the central unit be restarted.

It may also be conceivable to combine the subprograms into a common control program and to assign each subprogram a separate cycle time optimized for the respective subprogram. In this case, although the response of the controlled process would be as dynamic as possible, the varying cycle time would mean that a deterministic response would no longer be ensured.

SUMMARY OF THE INVENTION

The object of the present invention is to provide a possible means of changing from one subprogram to another subprogram in the course of operation of the central unit, and of still achieving high dynamics for the control program, with a deterministic response from the control program still being ensured at the same time.

The object is achieved for the method of operation by the features of claim 1. Corresponding solutions are adopted for the control program, the central unit and the automation system itself.

The peripheral modules may alternatively be central or local peripheral modules. Depending on the configuration of the control program, the cycle time may be determined by the communication with the peripheral modules. This applies when the peripheral modules are in the form of local peripheral modules. In such a case, the cycle time may be shorter, in particular, than a bus time which is required for communication with all of the peripheral modules.

The central unit can communicate with the peripheral modules—particularly when they are in the form of local peripheral modules—using a field bus. In addition, the central unit may alternatively communicate with the peripheral modules using a serial or a parallel bus. Examples of serial buses are the PROFIBUS field bus, and also the ASi bus and IRTE. An example of a parallel bus is the PCI bus known from computer engineering.

It is possible for the central unit to communicate only with a subset of the peripheral modules in the course of execution of the activated subprogram. In this case, it is particularly possible for the central unit to communicate with each peripheral module in the subset once within the cycle time.

Alternatively or in addition, it is also possible for the central unit to communicate with a respective one of a plurality of peripheral modules in mutually corresponding time slices of successive cycle times in a predetermined order.

If in the event of a change condition arising in the course of execution of the control program, the central unit first deactivates the activated subprogram and then activates a different previously inactive subprogram, then it is a particularly simple matter to produce a change from one subprogram to another subprogram smoothly and without interruption.

The change condition may be dependent on a multiplicity of events. Examples of such events may be an internal operating state in the central unit; signals from a controlled process which are transmitted to the central unit via at least one peripheral module; at least one peripheral module being coupled or decoupled to/from the central unit; and/or selections transmitted to the central unit using a human/machine interface.

If in the event of the change condition arising, the central unit first stops communicating with the peripheral modules of the originally activated subprogram and then starts communicating with the peripheral modules of the newly activated subprogram, then observance of the cycle time continues to be ensured even during the change of program.

If the communication with peripheral modules with which the central unit communicates both in the course of execution of the originally activated subprogram and in the course of execution of the newly activated subprogram is maintained, then the involvement for changing from one subprogram to another subprogram is kept small.

If the central unit communicates with peripheral modules with which it communicates both in the course of execution of the originally activated subprogram and in the course of execution of the newly activated subprogram in the two subprograms in mutually corresponding time slices of the cycle times, the involvement for changing subprograms is particularly small.

BRIEF DESCRIPTION OF THE DRAWINGS

Other advantages and particulars can be obtained from the subsequent description of an exemplary embodiment in conjunction with the drawings.

DETAILED DESCRIPTION OF THE INVENTION

Figures 1, 2:
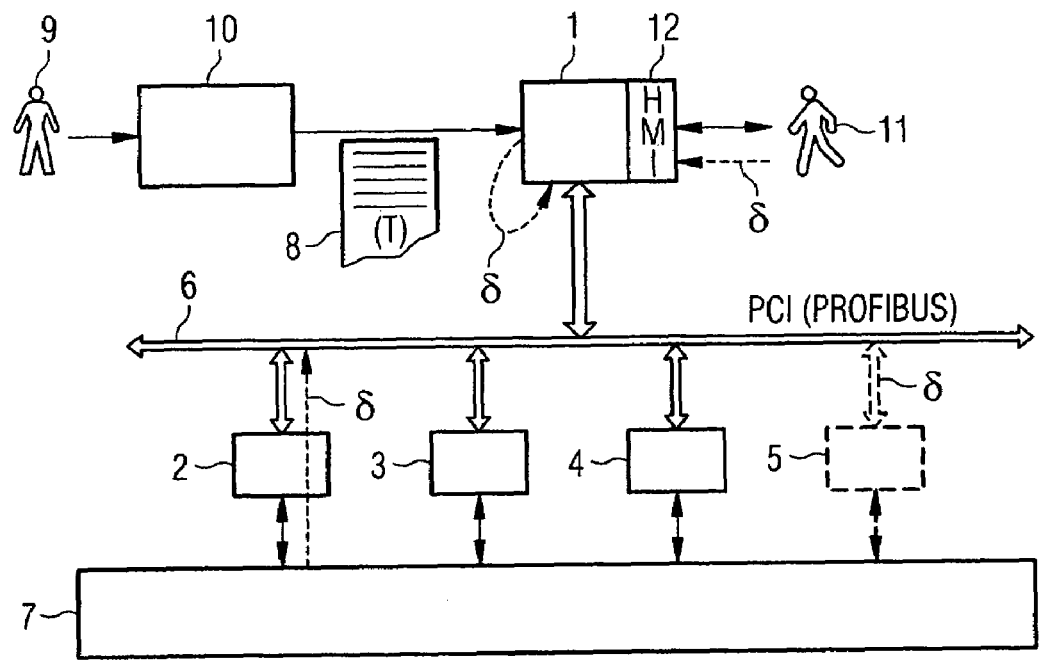
FIG. 1 shows a block diagram of an industrial technical process automated using an automation system according to an aspect of the present invention.
FIG. 2 shows the association between control and communication modules and sub-processes according to an aspect of the present invention.

According to an embodiment illustrated in FIG. 1, an automation system has a central unit 1 and peripheral modules 2 to 5. The central unit 1 is connected to the peripheral modules 2 to 5 by means of a bus 6 and is thus capable of communicating with the peripheral modules 2 to 5.

The peripheral modules 2 to 5 may be central peripheral modules 2 to 5. In this case, the automation system is in the form of a central automation system. The bus 6 may alternatively be a serial bus 6 or a parallel bus 6 in this case. An example of a serial bus 6 which is used in a central automation system is the bus in the S7-300 controller from Siemens AG. An example of a parallel bus 6 is, as indicated in FIG. 1 by the letters "PCI", the PCI bus known from computer engineering.

Alternatively, the peripheral modules 2 to 5 may be local peripheral modules 2 to 5. In this case, the bus 6 is normally in the form of a field bus 6, e.g. in the form of an IRTE (Industrial Real Time Ethernet), in the form of an ASi (Actuator Sensor interface) bus, or in the form of a PROFI-BUS. The latter is indicated in FIG. 1 in brackets as an alternative to the PCI bus form.

The central unit 1 uses the peripheral modules 2 to 5 to control and supervise an industrial technical process 7, e.g. a production, machining or packaging process 7. To this end, the central unit 1 has been programmed using a control program 8, which is first written by a programmer 9 on a programming appliance 10 and is then loaded into the central unit 1 and stored therein. The control program 8 is repeatedly executed by the central unit 1. In this case, a single instance of execution of the control program 8 occurs within a cycle time T which is stipulated by the programmer 9 when the control program 8 is written and—directly or indirectly—is part of the control program 8.

According to an aspect of the present invention shown in FIG. 2, the control program 8 has a plurality of subprograms TP1, TP2, TP3. In this case, each subprogram TP1 to TP3 has associated program modules SM1 to SM4 and communication modules KM1 to KM4. The association between the program modules SM1 to SM4 and between the communication modules KM1 to KM4 and the subprograms TP1 to TP3 can readily be seen from FIG. 2 in this context.

The program modules SM1 to SM4 relate to pure internal processing operations in the central unit 1. They require program execution times t1 to t4. The communication modules KM1 to KM4 are used for communicating with a respective one of the peripheral modules 2 to 5. They require communication execution times t5 to t8 in order to execute communications. In this case, the communication execution times t5 to t8 are normally the same as one another. This is not an absolute requirement, however.

As illustrated in FIG. 2, subprogram TP1 comprises the associated communication modules KM1 to KM3, subprogram TP2 comprises the associated communication modules KM3 and KM4, and subprogram TP3 includes the associated communication modules KM1, KM3 and KM4. Since each of the communication modules KM1 to KM4 is used for communicating with a single one of the peripheral modules 2 to 5, the central unit 1 thus communicates only with a subset of the peripheral modules 2 to 5 in the course of execution of one of the subprograms TP1 to TP3.

On the basis of the programming with the control program 8, the central unit 1 carries out a method of operation which is described in more detail below in connection with the embodiment of an aspect of the present invention illustrated in FIG. 3.

Figure 3:
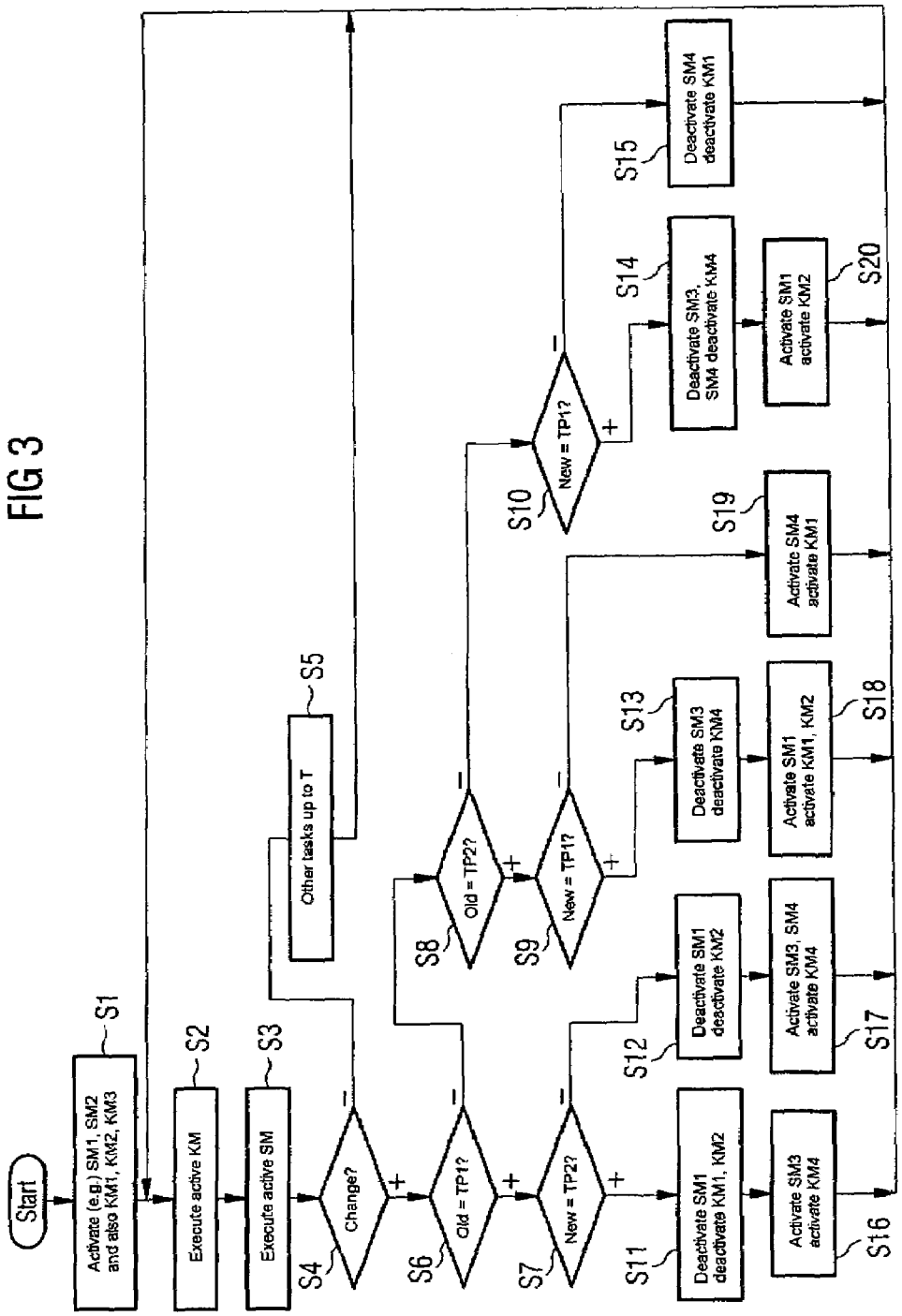
FIG. 3 shows a flowchart according to an aspect of the present invention.

According the embodiment illustrated in FIG. 3, one of the subprograms TP1 to TP3, in this case the subprogram TP1, is activated in step S1 at the start of the control program 8—e.g. through activation of the corresponding program and communication modules SM1, SM2, KM1, KM2, and KM3. In steps S2 and S3, the central unit 1 then executes the activated instances of the communication modules KM1 to KM4 and the activated instances of the program modules SM1 to SM4.

In step S4, the central unit 1 checks whether the activated subprogram, in this case the subprogram TP1, needs to be changed. It thus checks whether a change condition, indicated by the reference symbol δ in FIG. 1, has arisen.

By way of example, the change condition δ may involve a user 11 of the automation system setting an appropriate input for the central unit 1 using a human/machine interface 12 (HMI 12). This is indicated in FIG. 1 by a dashed arrow from the user 11 to the central unit 1.

The change condition δ may also be dependent on an internal operating state in the central unit 1, e.g. the expiration of a time. This is indicated in FIG. 1 by a dashed arrow which starts from the central unit 1 and also returns to the central unit 1 again.

As indicated in dashes for the peripheral module 2 in FIG. 1, the change condition δ may also be dependent on the detection and transmission of a signal associated with the process 7 from one of the peripheral modules 2 to 5 to the central unit 1.

Finally, the change condition δ may also be dependent, as indicated in FIG. 1 by virtue of the peripheral module 5 being in dashes, on at least one of the peripheral modules 2 to 5. In this case the peripheral module 5 is being coupled or decoupled to or from the central unit 1.

It goes without saying that combinations of these dependencies and multiple events are also conceivable.

If the change condition δ has not been satisfied, the central unit 1 branches to a step S5 and from there to step S2 again. In step S5, the central unit 1 executes other tasks, e.g. acyclic communications or completely different, non-communicative tasks, until the cycle time T expires. In the extreme case, it is even possible for the central unit 1 merely to wait for the cycle time T to expire in step S5.

If the change condition δ has been satisfied on the other hand, then the central unit 1 establishes in steps S6 to S10 which of the subprograms TP1 to TP3 is the currently activated subprogram and which of the subprograms TP1 to TP3 needs to be activated. Depending on the result of the checks in steps S6 to S10, one or two of steps S11 to S20 are performed.

In steps S11 to S15, the central unit 1 deactivates those of the program and communication modules SM1 to SM4, KM1 to KM4 which have been executed in the currently activated instance of the subprograms TP1 to TP3 but are no longer to be executed in that instance of the subprograms TP1 to TP3 which is to be activated again. In steps S16 to S20, the central unit 1 activates those of the program and communication modules SM1 to SM4, KM1 to KM4 which have not been activated to date but are required in the course of execution of that instance of the subprograms TP1 to TP3 which is to be activated again.

Based on the flowchart shown in FIG. 3, only one of the subprograms TP1 to TP3 is thus activated at a time. The central unit 1 executes only the activated instance of the subprograms TP1 to TP3. In the event of the change condition δ arising, on the other hand, the currently activated subprogram TP1 to TP3 is deactivated and then a different, previously inactive subprogram TP1 to TP3 is activated. In this case, in the event of the change condition δ arising, the central unit 1 first stops communicating with the peripheral modules 2 to 5 of the originally activated subprogram TP1 to TP3 in steps S11 to S15. However, this applies only to those instances of the peripheral modules 2 to 5 which are no longer required in the course of execution of the subprogram TP1 to TP3 which is to be activated again. The communication with peripheral modules 2 to 5 with which the central unit 1 communicates both in the course of execution of the originally activated subprogram TP1 to TP3 and in the course of execution of the newly activated subprogram TP1 to TP3 is maintained. Following deactivation of the program and communication modules SM1 to SM4 and KM1 to KM4, which are no longer needed, communication is then started with the newly added peripheral modules 2 to 5 of the newly activated subprogram TP1 to TP3.

The cycle time T is not changed when the activated subprogram TP1 to TP3 is changed. It is thus independent of the activated subprogram TP1 to TP3. This is possible because the condition:

$$T = \mathrm{Max}(T1, T2, T3) + \delta T \quad (1)$$

is satisfied by the cycle time T. In this case, T1 to T3 are subprogram times which are required in order to execute a respective one of the subprograms TP1, TP2 and TP3. As can be seen in FIG. 2, these times result in:

$$T1 = t1 + t2 + t5 + t6 + t7 \quad (2)$$

$$T2 = t2 + t3 + t7 + t8 \quad (3)$$

$$T3 = t2 + t3 + t4 + t5 + t7 + t8 \quad (4)$$

The time reserve δT is greater than 0. It should satisfy the condition:

$$0 < \delta T < \mathrm{Min}(\delta T1, \delta T2, \delta T3) \quad (5)$$

as a preference. In this case, the difference times δT1 to δT3 are defined as follows:

$$\delta T1 = t3 + t4 + t8 \quad (6)$$

$$\delta T2 = t1 + t4 + t5 + t6 \quad (7)$$

$$\delta T3 = t1 + t6 \quad (8)$$

It therefore holds true that:

$$T1 + \delta T1 = T2 + \delta T2 = T3 + \delta T3 = t1 + \ldots + t8 \quad (9)$$

As a result, although the cycle time T is thus longer than the longest of the subprogram times T1 to T3, it is shorter than the time which is required in order to execute all of the subprograms. This is because this time would correspond to the sum of the execution times t1 to t8.

The program execution times t1 to t4 are—particularly when the automation system is in the form of a local automation system—often much shorter than the communication execution times t5 to t8. In such cases, the program execution times t1 to t4 are negligible within the context of the above equations 1 to 9. Even when communicating using a memory interface, the program execution times t1 to t4 are usually negligible. In this case, the cycle time T satisfies the condition that it is shorter than the sum of the communication execution times t5 to t8. The sum of the communication execution times t5 to t8 corresponds to a bus time which is required in order to communicate with all of the peripheral modules 2 to 5. In the situations described below in conjunction with FIGS. 4 to 6, this is always the assumption in this case. In these figures, it has also been assumed that the communication execution times t5 to t8 are the same as one another.

Figure 4:
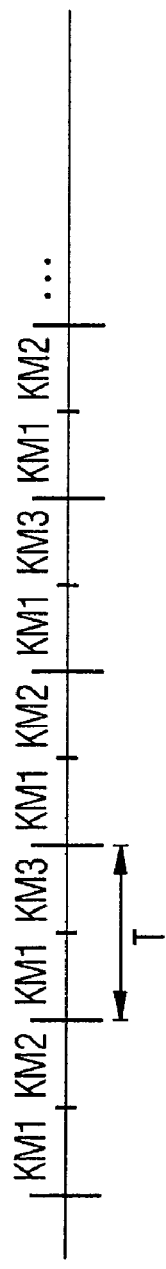
FIGS. 4 to 6 show timing diagrams in a basic illustration according to an aspect of the present invention.
Figure 5:
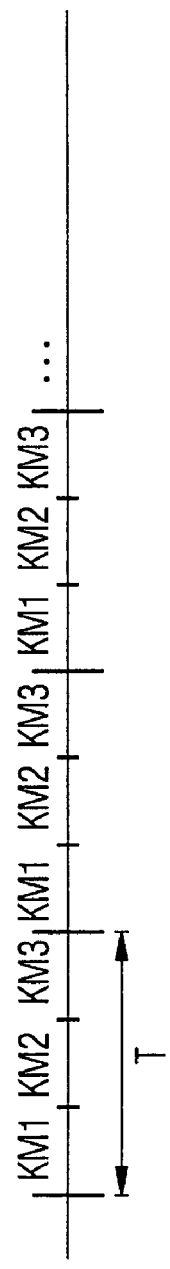
Figure 6:
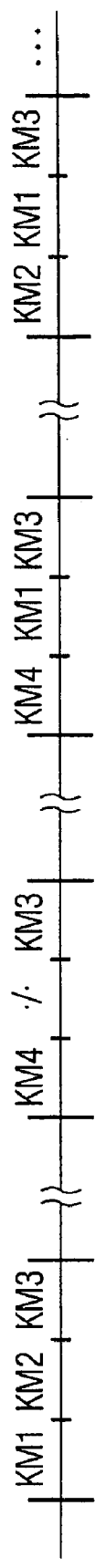

According to the embodiments illustrated in FIGS. 4 to 6, the cycle time T is twice (FIG. 4) or three times (FIGS. 5 and 6) as long as one of the communication execution times t5 to t8. It is divided into a number of time slices of equal size which each have the length of one of the communication execution times t5 to t8. The number of time slices is thus smaller than the number of peripheral modules 2 to 5, in particular.

In FIG. 4, it has been assumed that the subprogram TP1 has been activated. As indicated in FIG. 4, the communication module KM1 is always executed in the first time slice of each cycle time T, that is to say communication takes place with the peripheral module 2. In the second time slice, the communication module KM2 and the communication module KM3 are executed alternately, that is to say in a predetermined order. Hence, communication takes place alternately with the peripheral modules 2 and 3. The communication module KM1 is thus associated with the first time slice of the cycle time T. The communication modules KM2 and KM3 are associated with the second time slice of the cycle time T. The communication module KM4 is not associated with any time slice. Each time slice involves communication with a single one of the peripheral modules 2 to 5 associated with this time slice. This procedure which has been described in connection with the subprogram TP1 is in principle naturally also possible when executing the other subprograms TP2, TP3.

In FIG. 5 it has also been assumed that the subprogram TP1 has been activated. As illustrated in the embodiment of FIG. 5, in which the cycle time T is longer, the central unit 1 communicates with each peripheral module 2 to 5 being addressed in the course of the activated subprocess TP1 to TP3 once within the cycle time T. In the illustration shown in FIG. 5, in which the subprocess TP1 is assumed to have been activated, the communication modules KM1 to KM3 are thus executed, which is equivalent to communication with the peripheral modules 2 to 4.

FIG. 6 shows the dynamic association between the communication modules KM1 to KM4 and the individual time slices according to an aspect of the present invention. If, for example, the subprogram TP1 has been activated first, then the communication module KM1 is executed in the first time slice, the communication module KM2 is executed in the second time slice and the communication module KM3 is executed in the third time slice.

Following a change to the second subprogram TP2—indicated by two curved lines in FIG. 6—the communication module KM3 continues to be executed in the third time slice. In the first time slice, the communication module KM4 is executed, the second time slice not being used.

If there is now a change to the third subprogram TP3 at a later time—again indicated by two curved lines in FIG. 6—then the communication modules KM1 and KM3 continue to be executed in the first and third time slices. The second time slice, which was free before, is engaged by the communication module KM1. If there is now a change back to the first subprogram TP1 at a later time—also indicated by two curved lines again in this case—then the communication modules KM1 and KM3 remain associated with the second and third time slices. The communication module KM2 is therefore assigned to the first time slice.

From the above, it can be seen that the present invention does not involve the communication modules KM1 to KM4 being permanently (statically) associated with particular time slices. Instead, the association is made dynamically. When changing from one of the subprograms TP1 to TP3 to another of the subprograms TP1 to TP3, the communication modules KM1 to KM4 activated in the two subprograms remain associated with the same time slices, however, that is to say are executed in mutually corresponding time slices in both of the subprograms TP1 to TP3.

In accordance with the present invention, improved dynamics can thus be achieved for a level of hardware complexity which is the same as in the prior art. This avoids changeover times and downtimes for the central unit 1. Nevertheless, a strictly deterministic control response is achieved.

An example of one typical application of the present invention involves the automation system controlling a work cell, where the central unit 1 is associated with the work cell and the work cell is successively supplied with various mobile units which each have peripheral modules 2 to 5. In such a case, it is naturally necessary to operate only the peripheral modules 2 to 5 of the mobile unit which is currently present.

A similar situation is also obtained when the central unit 1 is associated with a mobile unit which successively commissions various workstations. In this case too, it is necessary to communicate only with the peripheral modules 2 to 5 of the respective work unit in each case.

Identification of which mobile unit is currently being supplied to the workstation or on which workstation a mobile unit is currently located can be established, for example, using an ordinary electromechanical slot coding.

The invention claimed is:

1. A method of operation for a central unit in an automation system, the central unit repeatedly executing a control program that is stored in the central unit, a single instance of the execution of the control program occurring within a cycle time which is set by the control program, the control program comprising at least two subprograms, wherein only one of the subprograms is activated at a time, the central unit executing only an activated subprogram, the cycle time being independent of the activated subprogram, shorter than the time required in order to execute all of the subprograms, and at least as long as the longest of the times periods required in order to execute one of the subprograms once, the method comprising the steps of:

(a) communicating via a bus with a plurality of peripheral modules during the execution of the control program;

(b) splitting the cycle time into a plurality of time slices, wherein the number of time slices is smaller than the plurality of peripheral modules;

(c) assigning each of the plurality of peripheral modules to a maximum of one of the time slices in activating one of the subprograms; and (d) communicating with a single one of the plurality of peripheral modules within each time slice, wherein the peripheral modules are associated with the time slice during the execution of the activated subprogram.

2. The method according to claim 1, wherein the cycle time comprises a shorter time than a bus time required for communicating with all of the plurality of peripheral modules.

3. The method according to claim 1, wherein the central unit communicates with the plurality of peripheral modules using a field bus.

4. The method according to claim 1, wherein the central unit communicates with the plurality of peripheral modules using at least one of the group consisting of a serial bus and a parallel bus.

5. The method according to claim 1, wherein the central unit communicates with a subset of the plurality of peripheral modules during the execution of the activated subprogram.

6. The method according to claim 5, wherein the central unit communicates with each of the plurality of peripheral modules in the subset once within the cycle time.

7. The method according to claim 1, wherein the central unit communicates with a respective one of the plurality of peripheral modules in mutually corresponding time slices of successive cycle times in a predetermined order.

8. The method according to claim 1, wherein the central unit deactivates the activated program and activates a different previously inactive subprogram in response to a change condition associated with the execution of the control program.

9. The method according to claim 8, wherein the change condition is dependent on at least one of the group consisting of an internal operating state in the central unit, signals received from a controlled process that are transmitted to the central unit via at least one of the plurality of peripheral modules, at least one of the plurality of peripheral modules being coupled to or decoupled from the central unit, and selection from a user that are transmitted to the central unit using a human/machine interface.

10. The method according to claim 8, wherein the central unit stops communicating with a first plurality of peripheral modules associated with the activated subprogram and begins communicating with a second plurality of peripheral modules associated with a newly activated subprogram based on the occurrence of the change condition.

11. The method according to claim 10, wherein the central unit communicates with the plurality of peripheral modules during the execution of the activated subprogram and during the execution of the newly activated subprogram of the at least two subprograms in mutually corresponding time slices associated with the cycle time.

12. The method according to claim 1, wherein the central unit further comprises a control program for programming an automation system.

13. The method according to claim 12, wherein the automation system comprises the central unit and the plurality of peripheral modules, wherein the central unit and the plurality of peripheral modules are connected via a bus.

14. A method of operation for an automation system comprising a control program loaded into a central unit, the control program having a plurality of subprograms, each of the plurality of subprograms comprising at least one program module and at least one communication module for controlling a process, the method comprising the steps of:

executing a first one of the at least one communication module associated with a first one of the plurality of subprograms within a first cycle time;

continuing to execute the first one of the at least one communication module during a second cycle time when the first one of the at least one communication module is associated with a second one of the plurality of subprograms; and executing a second one of the at least one communication module during the second cycle time when the second one of the at least one communication module is associated with a second one of the plurality of subprograms.

15. The method according to claim 14, further comprising deactivating the execution of the first one of the at least one communication module during the second cycle time when the first one of the at least one communication module is not associated with the second one of the plurality of subprograms.

16. The method according to claim 14, wherein the first and the second cycle time comprise the same duration, and wherein the duration is longer than the longest subprogram time and shorter than the time required for executing all the plurality of subprograms.

17. The method according to claim 14, wherein the first cycle time comprises a plurality of time slices, whereby each one of the at least one communication module is executed within one of the plurality of time slices within the first cycle time upon activation.

18. The method according to claim 14, wherein the second cycle time comprises a plurality of time slices, whereby each one of the at least one communication module is executed within one of the plurality of time slices within the second cycle time upon activation.

19. The method according to claim 14, wherein the executed first one of the plurality of subprograms is deactivated and the second one of the plurality of subprograms is activated in the event of a change condition.

20. The method according to claim 19, wherein the change condition comprises at least one of the group consisting of an internal operating state in the central unit, a signal received from the process, at least one peripheral module coupled to the central unit, at least one peripheral module decoupled from the central unit, and a user input received by the central unit from an interface.

21. An automation system comprising a central unit in communication with a plurality of peripheral modules by means of a bus for controlling a process, the automation system comprising a computer program loaded into the central unit, the computer program comprising a plurality of subprograms each having a plurality of communication modules and program modules for controlling the process by means of the peripheral modules, each of the plurality of subprograms executing within a cycle time, the plurality of communication modules associated with any one of the plurality of subprograms executing within time slices within the cycle time, wherein a first one of the plurality of communication modules associated with both a first one of the plurality of subprograms and a second one of the plurality of subprograms will continue to execute in a first cycle time corresponding to the first one of the plurality of subprograms and a second cycle time corresponding to the second one of the plurality of subprograms.

22. The automation system according to claim 21, wherein the cycle time for executing each of the plurality of subprograms is the same.

23. The automation system according to claim 21, wherein the bus comprises at least one of the group consisting of a field bus, a serial bus, a parallel bus, and a PCI bus.

24. The automation system according to claim 21, wherein the field bus comprises at least one of the group consisting of an industrial real time Ethernet bus, and an actuator sensor interface bus.

25. The automation system according to claim 21, wherein the central unit further comprises an interface for enabling a user to set an appropriate input for the central unit.

26. The automation system according to claim 21, wherein each of the time slices corresponds to communication with one of the plurality of peripheral modules.

* * * * *